United States Patent [19]

Diessner

[11] 3,726,154
[45] Apr. 10, 1973

[54] ARRANGEMENT FOR SECURING HOUSINGS IN A REAR AXLE ASSEMBLY

[75] Inventor: Eberhard Diessner, Wolfsburg, Germany

[73] Assignee: Volkswagenwerk Aktiengesellschaft, Wolfsburg, West, Germany

[22] Filed: Jan. 26, 1972

[21] Appl. No.: 220,739

[30] Foreign Application Priority Data

Feb. 17, 1971 Germany.....................P 21 07 474.8

[52] U.S. Cl....................74/607, 180/88, 301/124 H
[51] Int. Cl...............................F16h 57/02
[58] Field of Search......................74/607; 180/70 R, 180/71, 75, 88; 301/124 H

[56] References Cited

UNITED STATES PATENTS

| | | | |
|---|---|---|---|
| 2,569,452 | 10/1951 | Buckendale | 74/607 |
| 3,303,721 | 2/1967 | Puidokas | 74/607 |

*Primary Examiner*—Charles J. Myhre
*Assistant Examiner*—F. D. Shoemaker
*Attorney*—Granville M. Brumbaugh et al.

[57] ABSTRACT

Arrangement for preventing relative rotation between a differential gear housing and an axle housing tube in a motor vehicle rear axle assembly. The differential gear housing, which may be made of cast non-weldable material, is provided with a sleeve-like portion in the direction of the axle, surrounding and supporting one end of the axle housing tube. According to the invention, the sleeve-like portion has an opening therein extending substantially radially inward. A pin-like device is arranged in the opening in contact with the sides thereof and is welded to the axle housing tube. This device thereby attaches the axle housing tube to the differential gear housing without the necessity of forming a weld with the differential gear housing.

7 Claims, 6 Drawing Figures

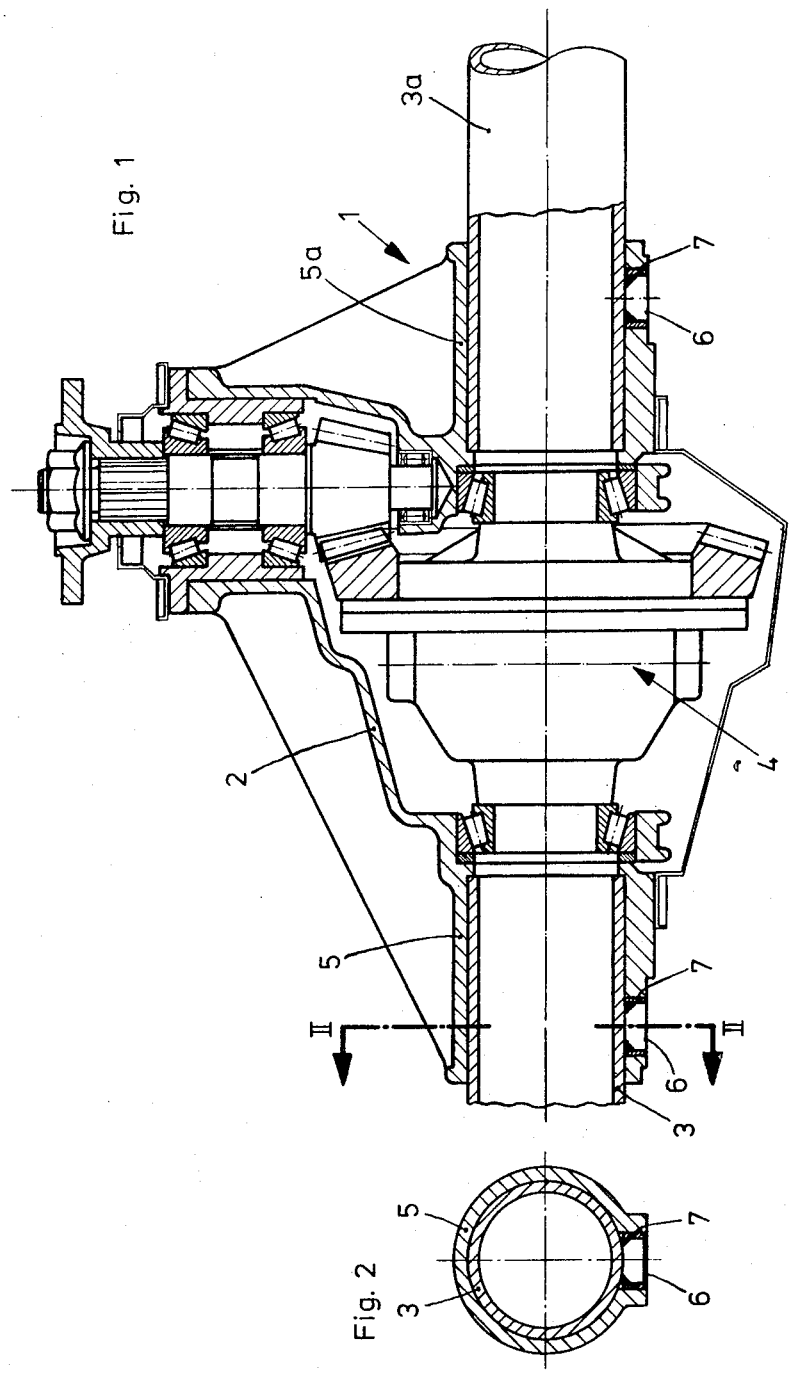

ARRANGEMENT FOR SECURING HOUSINGS IN A REAR AXLE ASSEMBLY

BACKGROUND OF THE INVENTION

The present invention relates to an arrangement for preventing relative rotation between an axle housing tube and a differential gear housing in a motor vehicle rear axle assembly.

The rear axle assembly of a motor vehicle is conventionally suspended at its outer ends from the motor vehicle body, for example by means of leaf springs. Such a rear axle assembly, which transmits the driving torque from the engine of the vehicle to the rear wheels, is subject to high torsional stresses. Since the housing of the rear axle assembly consists of several parts — namely a differential gear housing and normally two laterally extending axle housing tubes — these parts must be firmly attached together to prevent relative rotation when torque is applied. The position of the individual parts with respect to each other must be precisely maintained so as not to alter the position, relative to the vehicle body, of the spring mounting blocks, shock absorber mountings and the like which are provided on the axle housing tubes. For example, it is not normally sufficient merely to press the axle housing tubes together with the differential gear housing since, due to the load, these various parts tend to shift with respect to each other in the course of time, even though only slightly.

One known arrangement for providing a strong, reliable joint between the axle housing tubes and the differential gear housing is to cast and bore out sleeves on either side of the differential gear housing and to press the axle housing tubes into these sleeves. The so-called "plug welding" technique is then used to provide the desired safeguard against relative axial shifting of the parts as well as relative rotation. This is accomplished by providing one or more radially extending holes or openings in the differential housing sleeves and welding the steel axle housing tubes to the sleeves through these holes.

This type of joint between the axle housings and the differential gear housing requires the differential gear housing and its sleeves to be constructed of a weldable cast material, such as malleable cast iron, making it possible to obtain the fusion welding connection with the steel axle housing tubes. Due to the heat treatment which is necessary to achieve a weldable internal cast structure, malleable cast iron and similar materials are more expensive to produce than non-weldable raw materials although, from the point of view of rigidity, these materials are equal in value.

In an attempt to take advantage of non-weldable but cheaper cast materials, the necessary safeguards against relative rotation and axial displacement of the differential gear housing and the axle housing tubes has been achieved by riveting the parts together. Due to the additional boring and riveting operations which are required, however, fabrication is made more expensive. In addition, this type of assembly is not possible, in some cases, for reasons of construction.

SUMMARY OF THE INVENTION

An object of the present invention is to provide an arrangement for joining the housing parts of a rear axle assembly in a manner that will prevent relative rotation of these parts under application of torque.

A further object of the present invention is to provide an arrangement for joining the housing parts of a rear axle assembly, the differential gear housing of which is made of non-weldable cast material.

A still further object of the present invention is to provide an arrangement for joining the housing parts of a rear axle assembly that avoids the disadvantages of riveting noted above.

The present invention is based on the principle that an element anchored to one of two parts to be connected may be projected into an opening in the other part so as to be free from play in the direction of the applied force. This arrangement, which is generally similar to a rivet shank, provides an effective solution to the problem of inhibiting relative rotation of the parts.

According to the invention, the sleeves of a cast differential gear housing are provided with at least one opening extending substantially radially inward. A pin-like device is arranged in each opening in contact with the sides thereof and welded to the axle housing tube that is fitted into the corresponding sleeve. This pin-like device thus serves as means for attaching its associated axle housing tube to the differential gear housing. Depending upon the shape of the opening in the sleeves, relative motion between the differential gear housing and the axle housing tubes may be limited in the circumferential direction and also in the axial direction of the axle housing tubes.

Since a weld is not required between either the axle housing tubes or the pin-like attaching devices and the differential gear housing, the differential gear housing may be made of inexpensive cast material. Since the attaching devices are welded to the external surfaces of the axle housing tubes, it is not necessary to provide matched holes in the axle housing tubes for insertion of a rivet. In addition, the riveting operation itself is entirely avoided. Finally, the possibility of stresses created by mortizing rivet shanks and by the force of compression of rivet heads is completely eliminated.

According to one preferred embodiment of the present invention, the attaching device which is inserted in the opening of a differential gear housing sleeve is made at least partially hollow and is welded to the axle housing tube within the region delimited by its external surfaces. Since no welding region is required outside the external surface, contact between the attaching device and the opening in the sleeve may be made at all points around the external surfaces of the attaching device thus preventing axial as well as circumferential relative motion of the axle housing tube with respect to the differential gear housing.

According to another preferred embodiment of the present invention, the sides of each opening are spaced in the axial direction from its associated attaching device. This arrangement permits the latter to be welded to the axle housing in the region between the external surfaces thereof and the sides of the opening. In this case, the space between the sides of the opening and the attaching device runs out in the axial direction of the axle housing tubes while preventing circumferential rotation.

According to the present invention, therefore, an element which is subject to sheering stress in the manner of a rivet shank is attached to each axle housing tube by means of a weld. This arrangement is extremely simple and thus inexpensive to manufacture. The attachment can be made by a series of simple operations all performed on the outside of the housings. Of particular advantage is the fact that the necessary openings in the differential gear housing sleeves may be made when the housing is cast. In contrast, if the differential gear housing and axle housing tubes are riveted together in the manner presently known in the art, the holes in the sleeves and the axle housing must be drilled in a single operation when the parts are joined together to provide a precise accommodation for insertion of the rivet.

In the case of the embodiment wherein the opening in the differential housing sleeve surrounds the attaching device with the latter substantially free of play in the axial as well as the circumferential direction, a length of tube is suitably provided as the attaching device and welded to the axle housing tube around its inner periphery.

In the alternative, it is possible to use a cup-shaped metal part with a hole in the bottom as the attaching device. The size of the hole is chosen to accommodate the smallest possible quantity of welding material sufficient to provide an attachment.

It is also possible to use a cup-shaped metal part without a hole in the bottom. Such a cup may be advantageously attached to the axle housing tube by an electric resistance weld (spot weld) at the bottom of the cup.

Finally, it is possible to use bar-shaped, i.e., solid-material as the attaching device. In this case the opening in the sleeve may be suitably provided with sufficient play in the axial direction to permit the external surfaces of the attaching device to be welded to the axle housing tube in the axial space between the attaching device and the sleeve opening.

BRIEF DESCRIPTION OF THE DRAWINGS

FIG. 1 is a longitudinal section through a rear axle assembly having a three-part rear axle housing that is joined together with an attaching device according to one preferred embodiment of the present invention.

FIG. 2 is a transverse section taken along the line II — II in FIG. 1.

DESCRIPTION OF THE PREFERRED EMBODIMENTS

Figure 3:
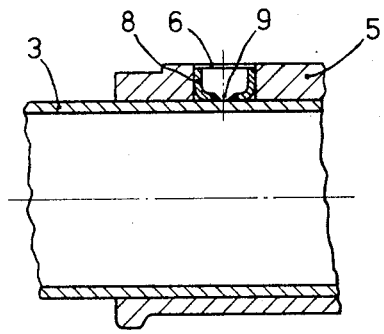
FIG. 3 is a longitudinal section through a portion of a rear axle assembly showing an alternative embodiment of the attaching device according to the present invention.

The preferred embodiments of the attaching device according to the present invention will now be described in connection with FIGS. 1 − 6 of the drawings. Like elements in FIGS. 1–6 are designated with the same reference numerals.

In FIGS. 1 and 2 there is shown a rear axle assembly of the type conventionally used in automotive vehicles designated generally as 1. This assembly comprises essentially a cast iron differential gear housing 2 and steel axle housing tubes 3 and 3a extending therefrom to the left and right, respectively. The axle housing tubes 3 and 3a are attached to the body of the vehicle by means of leaf springs (not shown) which absorb the torque that originates at the engine and is applied to the differential gear assembly, designated generally as 4, arranged in the differential gear housing 2.

In order to provide a solid connection between the differential gear housing 2 and the axle housing tubes 3 and 3a and to prevent these parts from twisting relative to each other, the differential gear housing 2 is provided with lateral extensions or sleeves 5 and 5a into which are pressed the axle housing tubes 3 and 3a, respectively. Each extension 5 and 5a is provided with a circular opening 6 either by drilling or, during casting, by means of a casting core. Into each opening 6 is forced a short length of tube 7 which serves as the attaching device. The tubes 7 are fusion welded to the respective axle housing tubes 3 and 3a along their inner edges so that the axle housing tubes are secured against relative rotation with respect to the differential gear housing 2 and secured against axial displacement.

The tubes 7 may be formed from weldable flat material or may be advantageously cut from a length of weldable tubing.

Due to the positive locking connection between the differential gear housing 2 and the axle housing tubes 3 and 3a resulting from the welded tubes 7, it is possible to manufacture the differential gear housing 2 from inexpensive non-weldable cast material.

Figure 4:
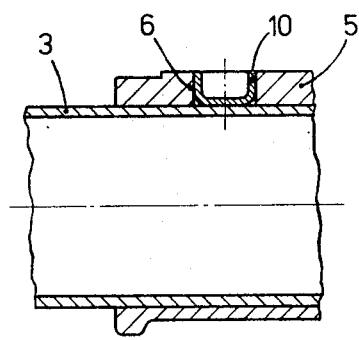
FIG. 4 is a longitudinal section through a portion of a rear axle assembly showing still another alternative embodiment of the attaching device according to the present invention.

FIGS. 3 and 4 illustrate two alternative embodiments of the attaching device according to the invention which may be inserted in a circular opening 6 in the sleeves 5 and 5a. In FIG. 3 the attaching device is a metal cup 8 provided at the bottom with a hole 9 for accommodating the welding material. In FIG. 4 the attaching device is a cup-shaped part 10 having a completely closed bottom. This part is connected to the axle housing tubes 3 and 3a by a spot weld.

Figure 6:
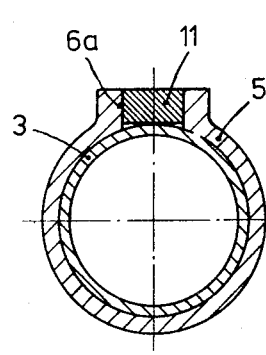
FIG. 6 is a transverse section taken along the line VI — VI in FIG. 5.
Figure 5:
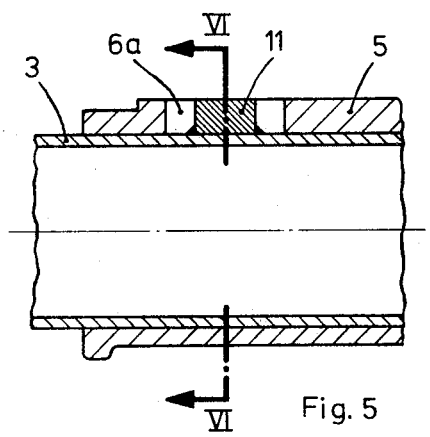
FIG. 5 is a longitudinal section through a portion of a rear axle assembly showing still another preferred embodiment of the attaching device according to the present invention.

The attaching device according to the invention may also be made of solid material. FIGS. 5 and 6 illustrate an attaching device 11 cut from bar stock. In this embodiment, an oblong or slotted opening 6a, which extends in the axial direction of the axle housing tubes 3 and 3a, is provided in the sleeves 5 and 5a, respectively. The oblong shape of the opening provides room for the welding seams on opposite sides of the attaching device 11. In this case, the attaching device lends likewise rigidity to the axle housing tubes and the differential gear housing in the circumferential direction.

It will be understood that the present invention is susceptible to variations, modifications, and adaptations as will occur to those skilled in the art. It is therefore intended that the present invention be limited only by the following claims or their equivalents.

I claim:

1. In a motor vehicle rear axle assembly comprising a differential gear assembly; at least one axle extending outwardly from the differential gear assembly; a cast differential gear housing surrounding the differential gear assembly; and an axle housing surrounding each axle, said axle housing arranged within a sleeve-like portion of the differential gear housing extending in the direction of the associated axle, the improvement comprising at least one opening in each sleeve-like portion extending substantially radially inward with respect to the axle associated therewith; and pin-like means arranged in the opening in contact with the sides thereof and welded to the associated axle housing, for attaching the axle housing to the differential gear housing; whereby the weld prevents motion of the attaching means with respect to the associated axle housing and the contact with the sides of the opening prevents motion of the attaching means with respect to the differential gear housing, at least in the circumferential direction.

2. The improvement defined in claim 1, wherein the attaching means is at least partially hollow and is welded to said axle housing within the region delimited by its external surfaces; and wherein the contact with the sides of the opening prevents axial as well as circumferential motion of the attaching means with respect to the differential gear housing.

3. The improvement defined in claim 2, wherein the attaching means is tube-shaped, and wherein the weld is arranged within the inner walls of the tube.

4. The improvement defined in claim 2, wherein the attaching means is cup-shaped and has a hole in the bottom, and wherein the weld is arranged in the hole.

5. The improvement defined in claim 2, wherein the attaching means is cup-shaped and wherein the bottom thereof is resistance-welded to the axle housing.

6. The improvement defined in claim 1, wherein the sides of the opening are spaced in the axial direction from the attaching means and wherein the attaching means is welded to the axle housing in the region between the external surfaces of the attaching means and the spaced sides of the opening.

7. The improvement defined in claim 6, wherein the attaching means is bar-shaped and wherein the external surfaces thereof are welded to the axle housing.

* * * * *